United States Patent [19]

Glass

[11] 3,798,960
[45] Mar. 26, 1974

[54] AUTOMATIC VISCOMETER WITH MULTIPLE CAPILLARY VISCOMETER TUBE

[75] Inventor: John Richard Glass, Mickleton, N.J.
[73] Assignee: Mobil Oil Corporation, New York, N.Y.
[22] Filed: June 19, 1972
[21] Appl. No.: 263,824

[52] U.S. Cl. .................................................. 73/55
[51] Int. Cl. ........................................... G01n 11/06
[58] Field of Search ............................... 73/55, 401

[56] References Cited
UNITED STATES PATENTS

| | | | |
|---|---|---|---|
| 2,095,282 | 10/1937 | Payne | 73/55 |
| 3,610,026 | 10/1971 | Topham | 73/55 |
| 3,071,961 | 1/1963 | Heigl et al. | 73/55 |
| 2,519,853 | 8/1950 | Rossell | 73/401 UX |
| 3,540,264 | 11/1970 | Cerrutti et al. | 73/55 |
| 3,604,247 | 9/1971 | Gramain et al. | 73/55 |

FOREIGN PATENTS OR APPLICATIONS

| | | | |
|---|---|---|---|
| 1,296,843 | 6/1969 | Germany | 73/55 |

Primary Examiner—Richard C. Queisser
Assistant Examiner—Joseph W. Roskos
Attorney, Agent, or Firm—A. L. Gaboriault

[57] ABSTRACT

An automatic viscometer featuring the use of a multiple capillary viscometer tube whereby capillary tubes of varying sizes are connected one to another in series and into which a sample liquid is drawn by controlled vacuum. In one of the preferred embodiments of the invention the viscometer utilizes a supply turntable and heated sample jackets for preheating liquid samples, a temperature bath to bring the sample being measured to controlled equilibrium, a series of automatic meniscus sensors to detect the flow of oil, and means for automatically computing viscosity from the sensor output. Thermistors are used as meniscus sensors.

24 Claims, 13 Drawing Figures

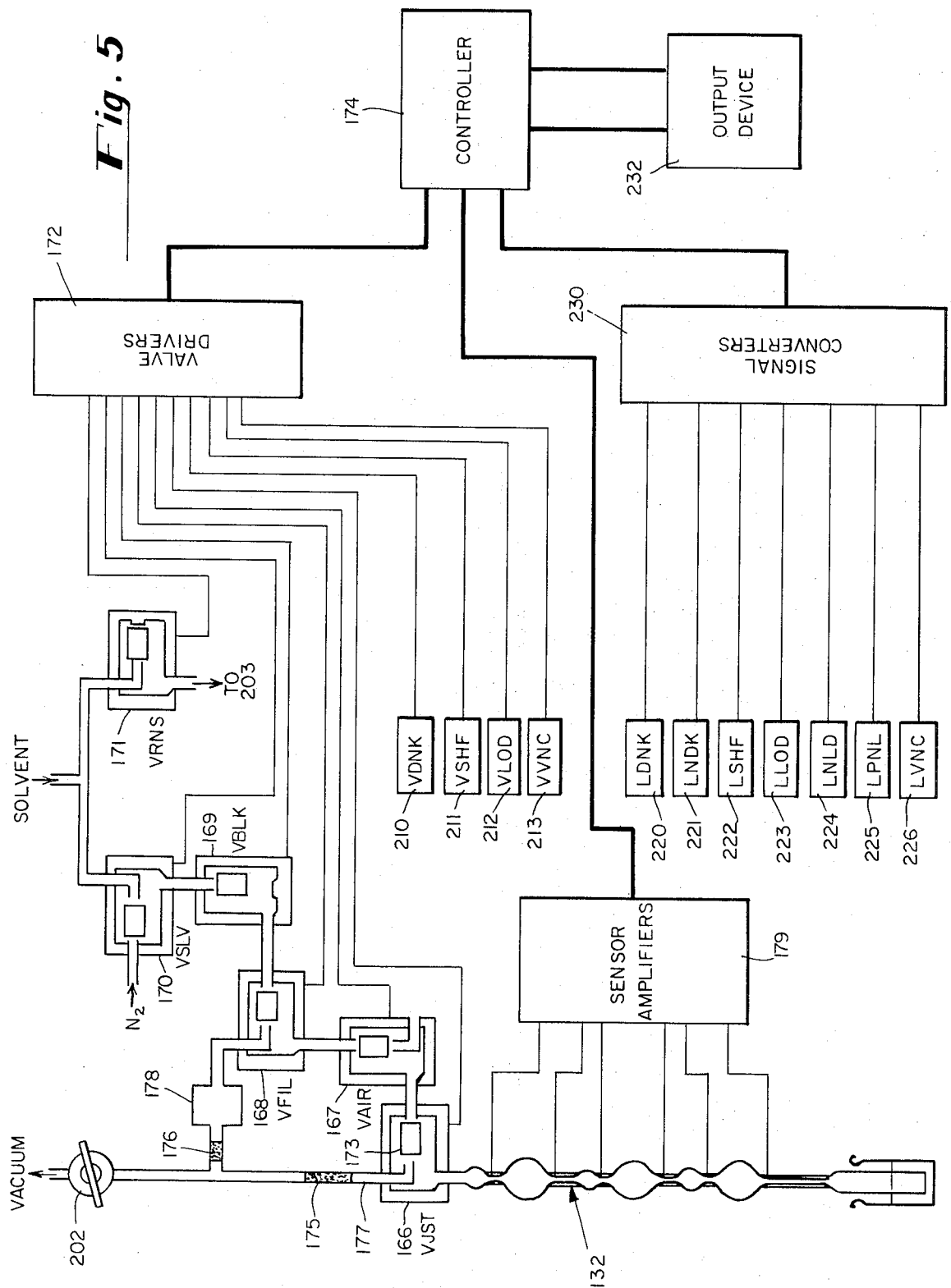

AUTOMATIC VISCOMETER WITH MULTIPLE CAPILLARY VISCOMETER TUBE

BACKGROUND OF THE INVENTION

1. Field of the Invention

The invention has utility wherever the viscosities of liquids are to be determined and has particular utility in oil refinery operations where frequent oil viscosity measurements must be taken at precisely controlled temperatures. Temperatures can be maintained well within the ASTM specification of ± 0.02° F.

2. Prior Art

Automatic viscosities such as disclosed in U.S. Pat. No. 3,071,961 (Heigl et al.) are known to the art. In Heigl et al. paired light beam-photodetectors are used to detect the downward flow of oil under controlled conditions from which the viscosity can easily be computed. A principal disadvantage of Heigl et al. and other automatic viscometers has been the necessity to use different sized capillary tubes to measure samples covering a wide range of viscosities. For accurate measurements the size of the capillary tube must be such that stream-line flow of a particular sample will occur to insure linearity between viscosity and time. Thus, the range of the viscosity of the sample liquids must be estimated before the correct sized tube may be employed and, either separate units using different sized tubes must be used or the tube of each viscometer must be replaced when a sample having a quite different viscosity from the preceding one is to be measured. Regardless of which plan is used this selection process prevents the operation from being completely automatic and ties up man-hours and resources.

The use of spark detectors to detect a meniscus of the flowing oil are also known to the art and can be used in place of photodetectors. A number of disadvantages are associated with the use of either photocell detectors or spark detectors. Photocell detectors are not satisfactory for use in measuring black oils and they require an inordinate amount of space and wiring to make them operational. On the other hand a spark detector system requires a high voltage circuit that may cause difficulties with other circuits in the instrument. In addition, the spark system generates too much electronic noise, particularly in the low voltage control circuits and in the many computer circuits and there is also potential explosion hazard when high-voltage sparks are used. Water in the oil also interferes with spark detectors.

SUMMARY OF THE INVENTION

It is, therefore, a principal object of this invention to provide a single viscometer tube which is capable of accurately measuring viscosities over a widely varying range.

It is a related object of the present invention to provide a viscometer unit which will be fully automatic over a wide range of samples for relatively unattended use.

It is another object of the present invention to provide an automatic viscometer which can preferably utilize thermistor detectors to provide flow times for obtaining viscosity readings of samples automatically.

It is still another object of the present invention to provide a temperature bath of approximately 2 liters with heating and regulating means and the overall capability of maintaining temperatures within the ASTM specification.

Another object of the present invention is to provide a single viscometer tube having multiple-sized capillaries which may be used to obtain viscosity readings of a wide range of samples.

Still another object of the present invention is to provide a filling system requiring only two sensors per capillary.

It is yet another object of the present invention to provide a convenient means to preheat samples.

In accordance with the above objects, a novel viscometer tube is provided having three interconnected capillaries of different sizes, the lower capillary being coarse, the succeeding capillary being less coarse and the top capillary being the least coarse. The capillaries are separated by efflux bulbs which hold sufficient liquid to insure accurate measurements. Thermistor meniscus sensors are positioned at the top and bottom of each efflux bulb to measure the liquid during the testing periods after temperature equilibrium has been achieved within a surrounding liquid bath. Samples are fed to the viscometer by means of a turntable which includes a heated sample jacket for preheating samples, thus reducing the time during which the sample must be maintained under the influence of the temperature bath before measurements can be taken.

In a preferred embodiment, pneumatic lifts raise the sample containers from the turntable to the tip of the viscometer tube. A controller automatically controls the filling, draining and flushing of the viscometer tubes, the operation of the turntable, and the measurement of time. Other circuitry controls water bath temperatures. Two individual units may be incorporated into the viscosity-measuring instrument both managed by a mini-computer which calculates viscosities and controls the print-out results in final report form. With the two-unit capability, liquid from two containers containing the same sample may be measured concurrently at two different temperatures, normally 100° and 210° F. in the case of oil refinery operations, or two different samples may be measured successively first at a 100° and then at 210°, each of the units being operated continually at the two different temperatures.

Thermistors of extremely small size are inserted through the capillary walls into the capillaries themselves, positioned above and below each of the efflux bulbs. An overflow bulb is positioned somewhat above each of the efflux bulbs.

When measuring is to commence, the sample as a whole is raised by a pneumatic lift until the viscometer tip is immersed therein and vacuum is applied to draw a portion of the sample into the viscometer tube. The time taken for the sample to be drawn up the viscometer tube is measured and forms the basis for correctly selecting the proper capillary. If the sample has a viscosity of less than a predetermined viscosity, it will pass up through the lower capillary and fill the lower bulb in less than a predetermined length of time. The automatic controls will be set so that if the sensor above the lower bulb is not covered within this predetermined time, the sample will be stopped at this sensor. Sample liquids such as oils, with viscosities less than the predetermined amount will be allowed to continue upward. The same events occur with the intermediate capillary and bulb. Thus, oils in a high range of viscosity are selected to be run in the lowermost larger capillary, oils within a medium viscosity range are assigned to the second capillary and oils of less viscosity than the medium range are allowed to rise to the upper capillary. Once the correct capillary has been selected and filled, a precisely controlled application of vacuum causes the upper level of the sample to be positioned just above the upper meniscus sensor for the particular capillary selected. Once the sample is brought to temperature equilibrium, it is released with the upper surface of the sample flowing past the two meniscus sensors for that particular capillary from which the flow time needed to compute the viscosity is obtained. The sample can then be measured a second time or the tube washed and made ready for the next sample. After the oil has drained, solvent is admitted by a valve to wash out the tube and nitrogen or air is blown through to completely clean the tube of all residue and to dry it.

For temperature control a double-walled two liter water bath is used in the automatic viscometer. The bath completely encloses the viscometer tube around which heated water is pumped which circulates back to the heat source through an outer concentric chamber. Thus, the inner area of the temperature bath is effectively insulated by the returning water flowing through the outer chamber. A thermistor and circuit similar to that used to sense the oil is used as the temperature sensor.

BRIEF DESCRIPTION OF THE DRAWINGS

FIG. 5 is a schematic showing the filling system valves that feed air to the pneumatic cylinders, limit switches that sense the position of the sample jar and connections to the controller and output device.

DESCRIPTION OF THE PREFERRED EMBODIMENT

Figure 1:
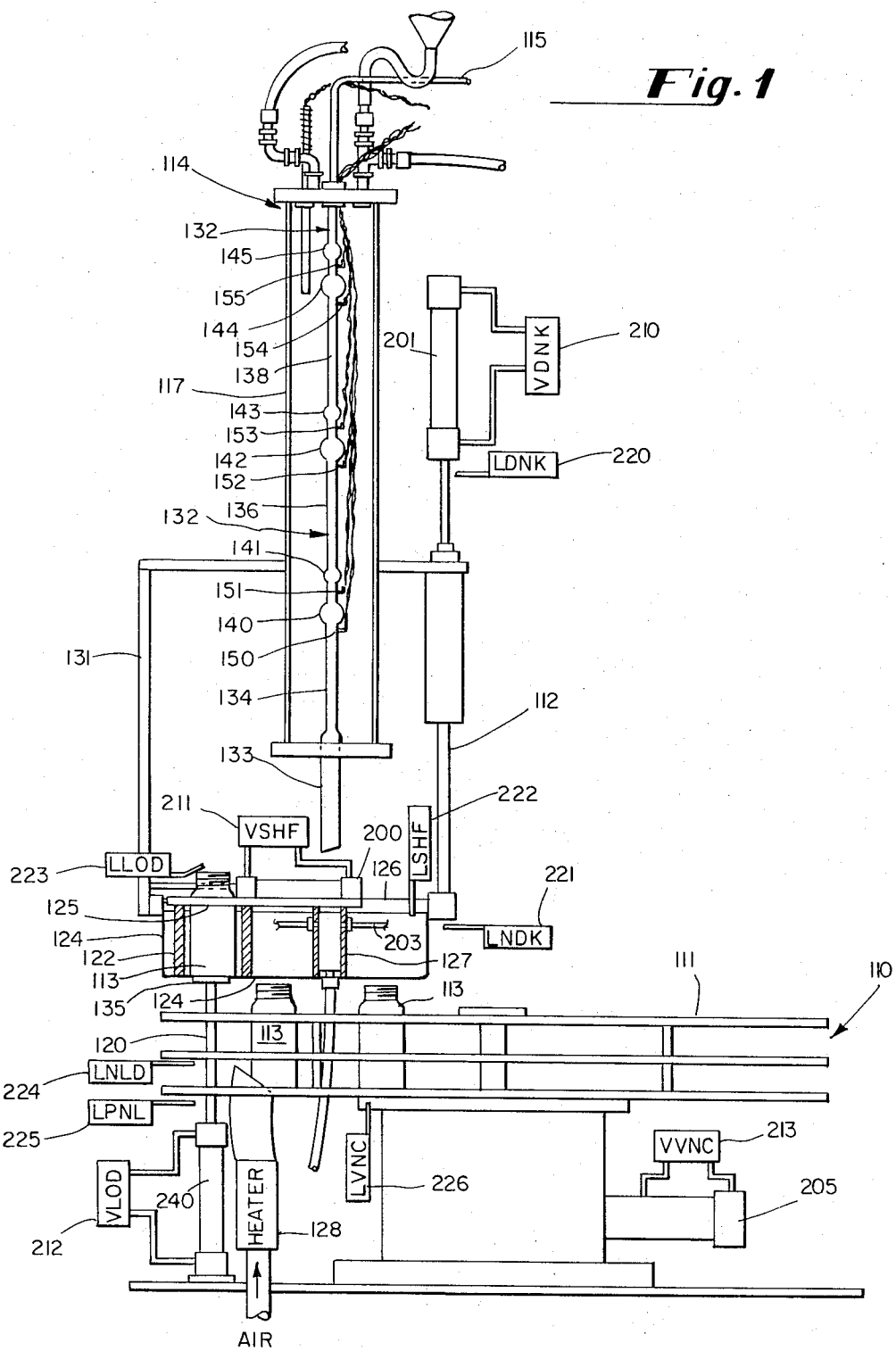
FIG. 1 is a front elevational view showing the automatic viscometer with supply means.

With reference to FIG. 1, the automatic viscometer of the invention comprises generally a supply system 110 which utilizes a revolving turntable 111; a pneumatic lift and adjustable framework system 112 to manipulate sample containers 113, a viscometer tube assembly 114 including vacuum means 115 and sample detecting means 150 to 155, a liquid bath means 117 for bringing the sample to temperature equilibrium; and automatic control and computing means (see FIG. 5).

Specifically with reference to FIGS. 1 and 2, the supply system 110 comprises a turntable 111 onto which sample containers 113 which contain the liquid samples, referred to as oil hereinafter, are placed in spaced relation around the turntable periphery 119. Any suitable type of container 113 such as 60 milliliter testing jars may be used. Sample containers 113 are rotated into position and a pneumatic sample lifter 120 lifts each sample container 113 in turn from the turntable 111 and places it in heated sample jacket 122, preparatory to testing. More detailed operation of the turntable with its selected sequences of operation will be discussed subsequently when the operation of the system is described, however, it should be noted that two viscometer testing unit assemblies as designated by reference numerals 121 and 123 in FIG. 2 can be operated concurrently adjacently as shown. Samples may be preheated before entering the heated jacket by a current of hot air supplied by heater 128, or by other means. While preheating the oil samples in these ways is optional it helps to prepare the sample for testing, reducing the time the sample must remain within the influence of the liquid bath 117 before testing may begin. The preheat function has particular utility when viscosity readings are to be taken at high temperature, in which case unheated samples might be too viscous to fill the tube properly.

In FIG. 1 sample platform 124 has an aperture located where the sample container 113 is inserted into the sample jacket 122 by lift means 120. Once the container 113 is inserted in the sample jacket 122 the container 113 together with the jacket 122 are shifted to the right by pneumatic cylinder 200 as carriage 125 which holds jacket 122 slides along cross rod 126 until the container 113 slides under the viscometer tip. It can be seen that platform 124 is the same height as the top support 135 of the lifter 120 so that as carriage 125 urges container 113 and jacket 122 to the right, container 113 will always be supported from beneath by platform 124.

A waste receiver 127 as shown in FIG. 1 is also mounted on carriage 125 and normally positioned below the viscometer tube assembly 114 until displaced by a sample container 113. As a sample container 113 is shifted onto platform 124, the jacket 122, container 113 and waste receiver 127 are all shifted to the right.

Once the sample container 113 is below the viscometer assembly 114 the entire framework 131 of which cross rod 126 is a part is lifted or moved upwardly by pneumatic cylinder 201 carrying the container 118, jacket 122 and platform 124 to an elevated position where the lower portion of the viscometer tube assembly 114 is immersed in the sample. During this positioning period, heating jacket 122 is serving to preheat the sample as the sample container 113 is being moved to the testing or measuring position.

Figure 3:
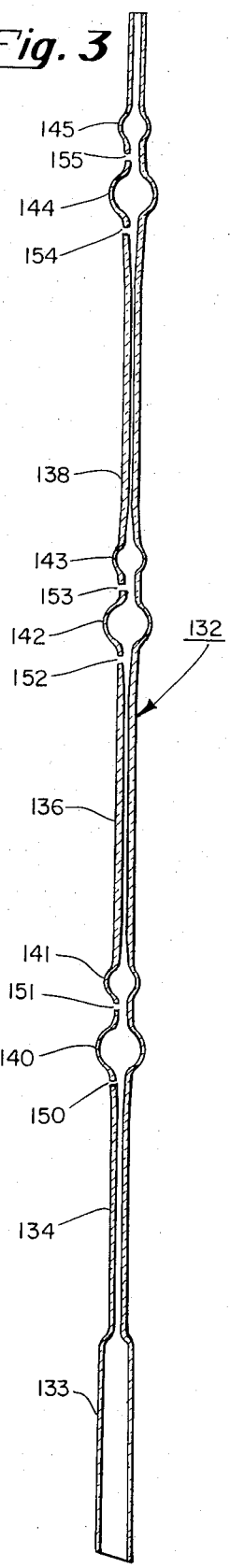
FIG. 3 is a detailed sectional view of the viscometer tube.

The viscometer tube assembly 114 comprises a viscometer tube 132 having an enlarged tip 133 which becomes immersed in the sample as described above and three different sized capillary tubes 134, 136 and 138 connected in series. With reference to FIG. 3, it will be noted that the lower capillary 134 is coarse for determining the viscosity of the more viscous samples, while capillary 136 is less coarse in size for determining the viscosities of less viscous samples and that capillary 138 is fine or the least coarse for determining the viscosities of samples of even lesser viscosity. Efflux bulbs 140, 142, and 144 are disposed above each of the capillaries 134, 136 and 138. The efflux bulbs 140, 142, and 144 permit considerably more of a sample to enter each capillary portion of viscometer tube 132 than would otherwise be possible, thus increasing the flow time in achievement of a more accurate reading. Above each of the efflux bulbs 140, 142 and 144 respectively are smaller overflow bulbs 141, 143 and 145 each of which allow the oil to flow above a particular capillary, efflux bulb, and meniscus sensor as hereinafter described without rising to the next succeeding capillary or the valve system in the case of the uppermost bulb 145.

With reference to FIGS. 1 and 3, meniscus sensors positioned at locations 150, 151, 152, 153, 154 and 155, are capable of detecting both upward and downward flow of oil through the viscometer tube. While photodetectors or spark-detectors may be used, the use of thermistors is contemplated in the preferred embodiment of this invention as hereinafter described.

Figure 4:
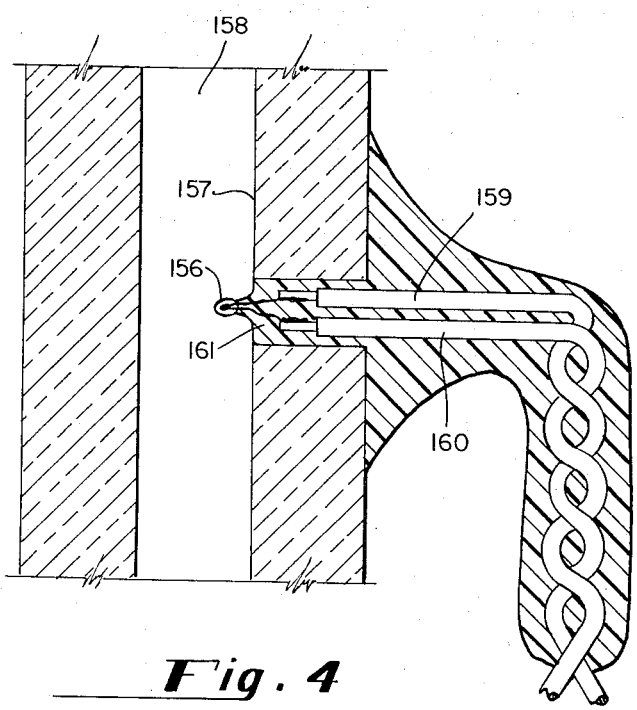
FIG. 4 is an enlarged partial cross-section of a capillary with one of the thermistor detectors inserted therein.

With reference to FIG. 4, a thermistor 156 is shown in use as a meniscus sensor. The thermistor 156 is actually inserted through the capillary wall 157 into the capillary bore 158. This is done at each of positions 150, 151, 152, 153, 154 and 155. Lead wires 159 and 160 are attached to each thermistor as shown. For the thermistors to function to measure thermal conductivity it is necessary that current be passed through them. Although they increase in sensitivity as the current is increased, the higher current raises the temperature of the thermistor causing local heating of the oil above the required temperature. It has been determined through experimentation that at 100° F. and with a current of 2 ma through a 1,000 ohm thermistor the sensitivity is good and there is no appreciable effect upon the results due to heating.

As shown in FIG. 4, the thermistors 156 are inserted in the capillary by drilling a hole of 1.6 millimeters in diameter in the sides of the capillary wall 157. It is advantageous to use as small a thermistor as possible for a number of reasons. The smaller thermistors have less tendency to interfere with the oil flow. This condition can be further improved upon by locating the thermistor 156 so that it protrudes only partway into the capillary. Use of small thermistors also means a faster response time. The response time depends upon the setting of the detector circuit and is difficult to measure since it is less than a second. This small lag in response does not produce a corresponding error in timing because the lag in starting and stopping the clock is the same and cancels. The thermal conductivities of all oils are quite similar and about seven times as great as air so that large changes in thermistor resistance occur when the oil passes the detectors.

A small thermistor 156 of a diameter of 360 microns with 25 micron diameter lead wires 159 and 160 should be used. This size of thermistor was found to work well with all types of oils at both 100° and 210° F. Errors due to the heating effect on the oil were found to be negligible. The thermistors can be conveniently placed in the capillary tubes in 1.6 millimeter holes and epoxy cemented in place at 161 with the thermistor extending into the bore 158.

Thus, thermistors can conveniently be used which have the advantage of being useable in black oil which is not true of photocell meniscus detectors. They also require less space and less complex wiring than the photocell detectors. On the other hand, spark detectors also previously used require a high voltage circuit, are not sensitive to small changes in level, and yet are subject to numerous types of interference with other equipment.

With reference to FIG. 5, the viscometer valve and circuitry systems are shown. Valves 166 to 171 are ordinary electric solenoid valves arranged as shown so that the solvent used during the wash cycle can be blown completely out of the valves. Solvent left in the valves would otherwise, by evaporating, interfere with the vacuum filling operation. Valve drivers 172 supply electric current to energize a plunger shown as 173 inside valve 166 to cover its end port. Removal of current causes the end port to be uncovered and the side reentrant port to be covered. The valves are energized at the proper times in response to signals from a controller 174. The system shown permits filling to a suitable point within the overflow bulbs without need for three sensors for each capillary as used by aforementioned U.S. Pat. No. 3,071,961. The use of three sensors per capillary or nine per tube would be expensive and require a length of tube not compatible with usual laboratory dimensions and also would require more sample to fill it. Another advantage of the filling system of the subject invention is that it puts the needed extra oil into a bulb as in the standard Atlantic manual viscometer ASTM D2515, Appendix B, 1970 rather than into a non-standard narrow tube, from whose walls the oil may not drain properly, as used by aforementioned U.S. Pat. No. 3,071,961.

In addition to the valves there are restrictors 175 and 176 and pneumatic capacitors 177 and 178. A constant vacuum of about 20 inches of mercury below atmospheric pressure is supplied to the system by regulator 202. If no oil is supplied to the viscometer, restrictor 175 will draw air at a fixed rate of about 0.4 ml per minute or restrictor 176 will draw air at about 40 ml per minute. Capacitor 177 has a volume of about 0.3 ml and capacitor 178 about 15 ml. Nitrogen flows through valve 170 to blow out the solvent and dry the viscometer. When valve 170 is energized the nitrogen flow is stopped and solvent washes the oil out of the tube. Valve 171 supplies solvent to wash the outside of the tip 133 of the tube 134 through a plurality of jets 203 (See FIG. 1).

Sensor amplifiers 179 supply current to the six thermistors and convert their responses to a signals that can be sensed by the controller 174. Valves 210 to 213 receive electrical energy from the valve drivers 172 as determined by the controller 174. They are 4 way valves and operate the pneumatic cylinders 200, 201, 240 and 205 as shown in FIG. 1.

Limit switches 220 to 226 sense the positions of the jar 113 and the jar handling parts. They receive electrical energy from signal converters 230 which convert their position to signals that can be sensed by controller 174. Controller 174 can be a system of pneumatic or electrical relays or a digital computer such as a PDP 8/m in a logical arrangement that will receive and send signals as needed according to the program described hereinafter. The output device 232 can be an indicating time clock, a printing time clock, a teletypewriter, a tape punch, or other known device capable of transmitting data to a human or to a machine. Such controllers and output devices are known and commercially available.

Figure 6:
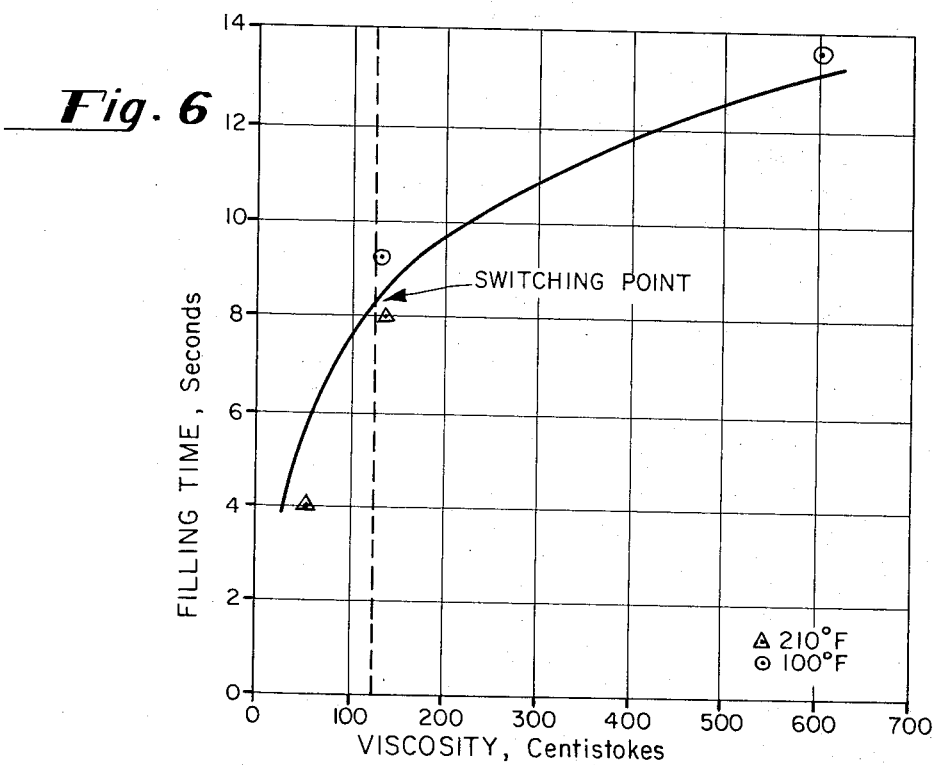
FIG. 6 is a graph illustrating the switching point for the lower capillary and bulb.
Figure 7:
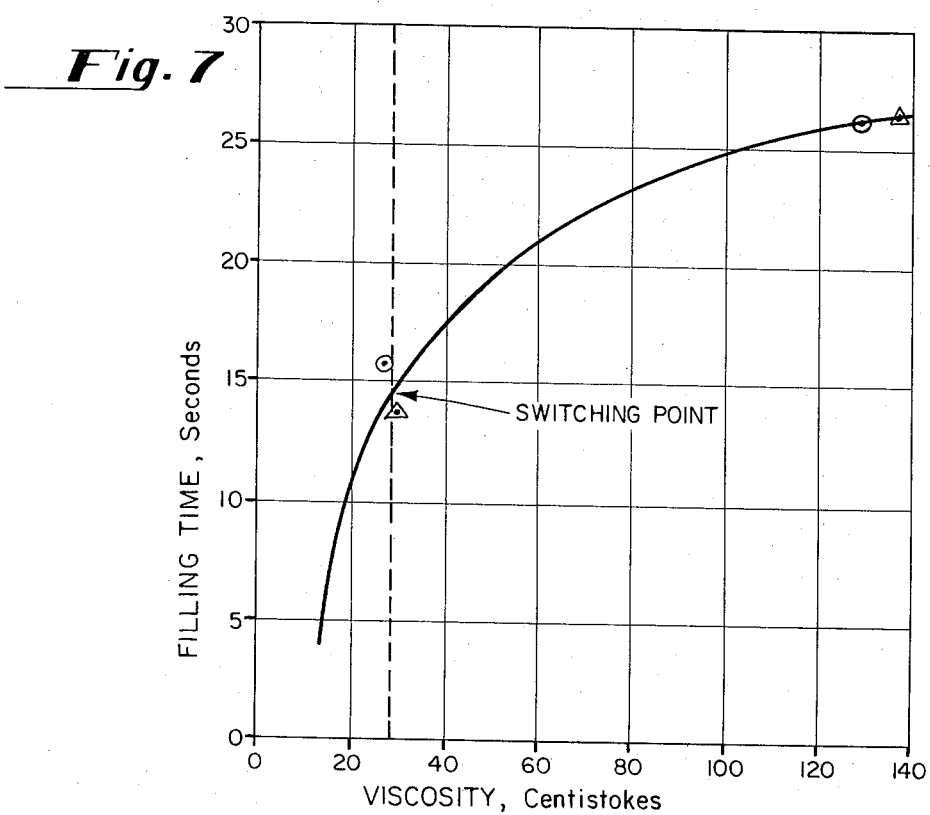
FIG. 7 is a graph illustrating the switching point for the intermediate capillary and bulb.

With reference to the graphs of FIGS. 6 and 7 the filling time in seconds for the system are shown as a function of viscosity in centistokes for a representative oil. It is critical that the oil viscosity measurements be taken in the correct sized capillary, i.e., in a capillary where streamline or laminar flow is achieved in a reasonable time. Through experimentation for the subject system it has been determined that slightly less than 9 seconds (9 sec hereinafter) is the time of filling at which the switching point should occur between the first and second capillaries so that the oil viscosity cut off point between capillaries 134 and 136 is 120 centistokes. If an oil sample takes longer than 9 seconds to rise to meniscus sensor position 151, then the sample is in that range of viscosities which should be measured in capillary 134, the lowermost capillary. When this occurs, through means later described, the vacuum will be turned off when the oil rises to sensor 151 preventing the oil from being drawn into the upper capillaries.

On the other hand if the oil sample rises to meniscus sensor 151 in 9 seconds or less, it is of a viscosity in the range of one of the upper capillaries and it will be permitted to continue to rise.

It is recognized that in the capillary selection fine capillaries will give laminar flow regardless of the flow rate. The only disadvantage of slow flow is the time required. As the capillary is made coarser and flow rate is increased the disadvantages are: (1) Significant kinetic energy effect, (2) errors in timing short intervals and (3) turbulent flow. The triple section viscometer tube of the subject invention has less kinetic energy errors than the standard ASTM tube. Automatic timing is more precise to enable results in 30 seconds that would require 200 seconds by the ASTM tube.

The graph of FIG. 7 shows the switching point between capillaries 136 and 138. This measurement occurs at meniscus sensor position 153. This occurs at slightly less than 15 seconds (15 sec hereinafter) and the mark-off or measuring transfer point is for oils from viscosity of 38 centistokes. Less viscous samples will be permitted to rise into the uppermost capillary while samples of a viscosity greater than 38 centistokes will be retained for measurement in capillary 136. Note that the meniscus sensor positions 151 and 153, i.e., those positions which are respectively above the lower two efflux bulbs 140 and 142 are the sensor positions used in these determinations and not the lower sensor positions 150 and 152. These lower sensors including 154 for the top capillary are used only in the timing process which takes place when the actual readings used in determining viscosity are taken as the oil descends.

Figure 8:
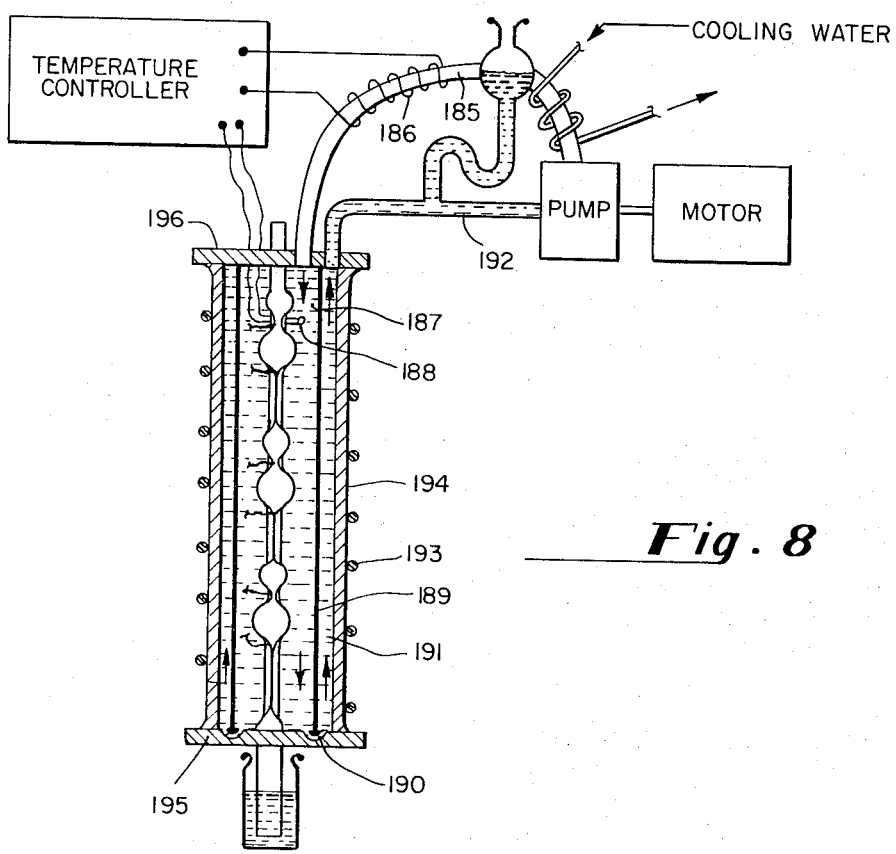
FIG. 8 shows the details of the constant temperature bath and heating system.
Figure 9A:
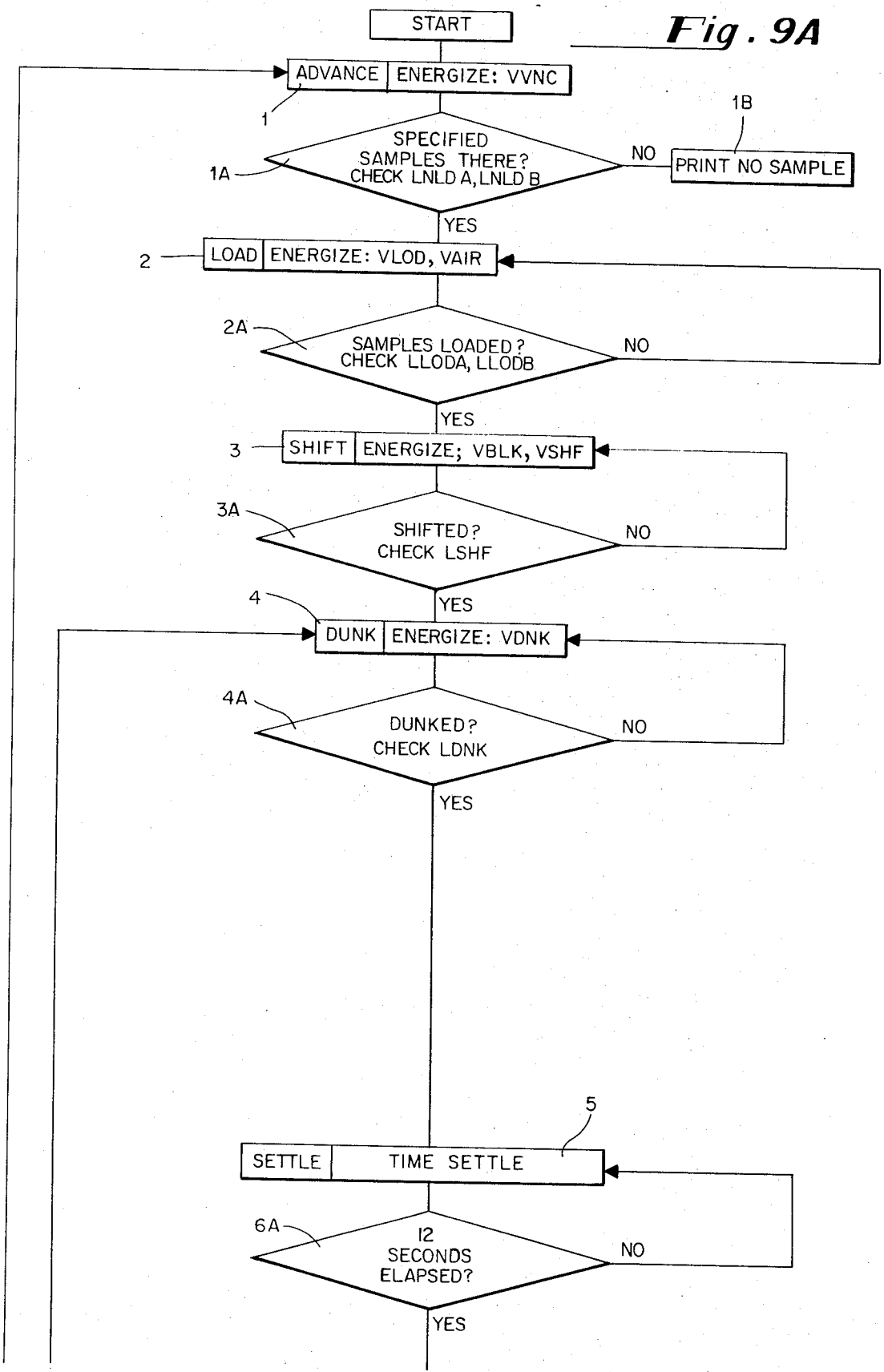
FIG. 9A-E shows a flow chart of the steps when the viscometer is automatically operated.
Figure 9B:
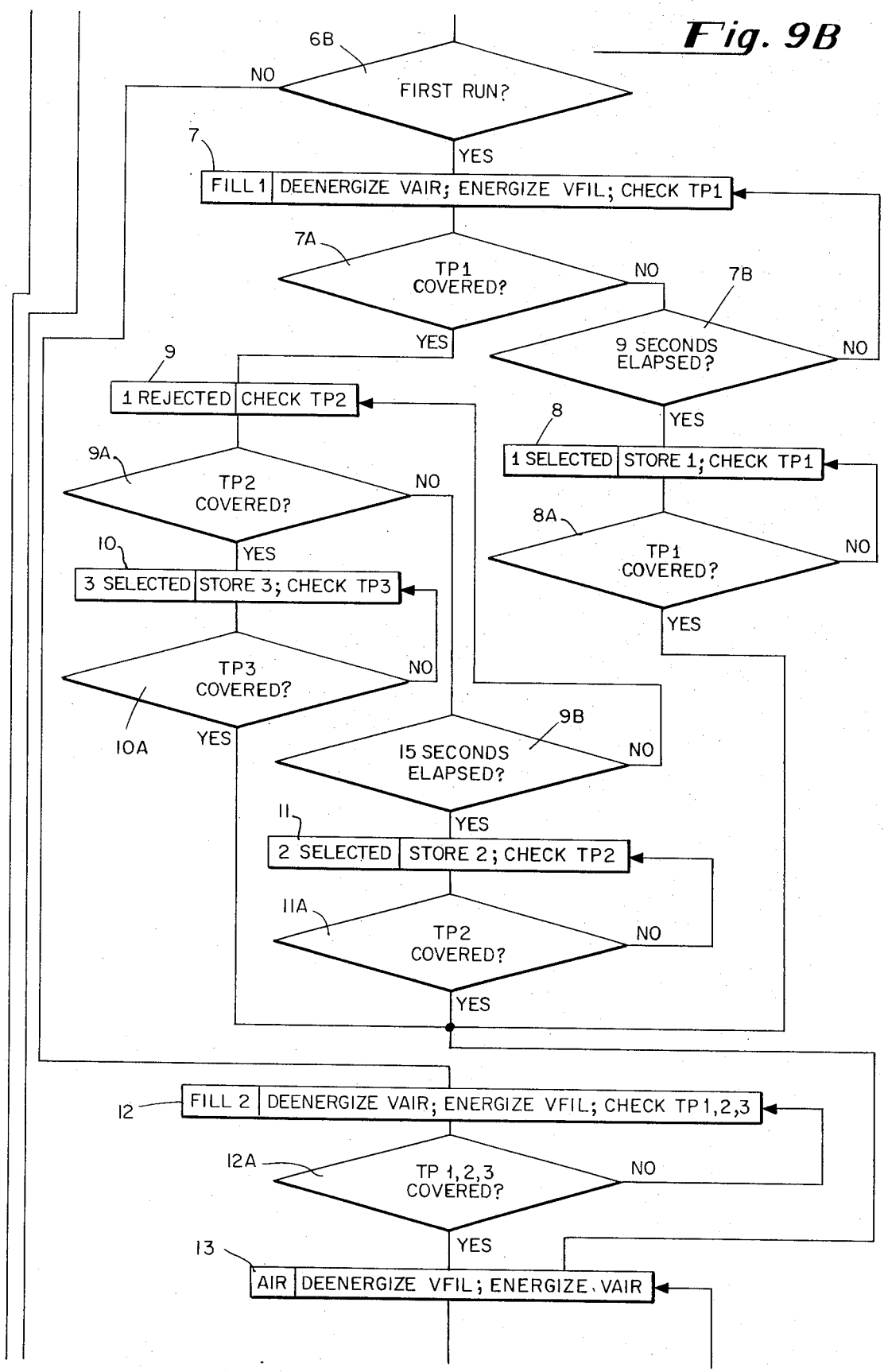
Figure 9C:
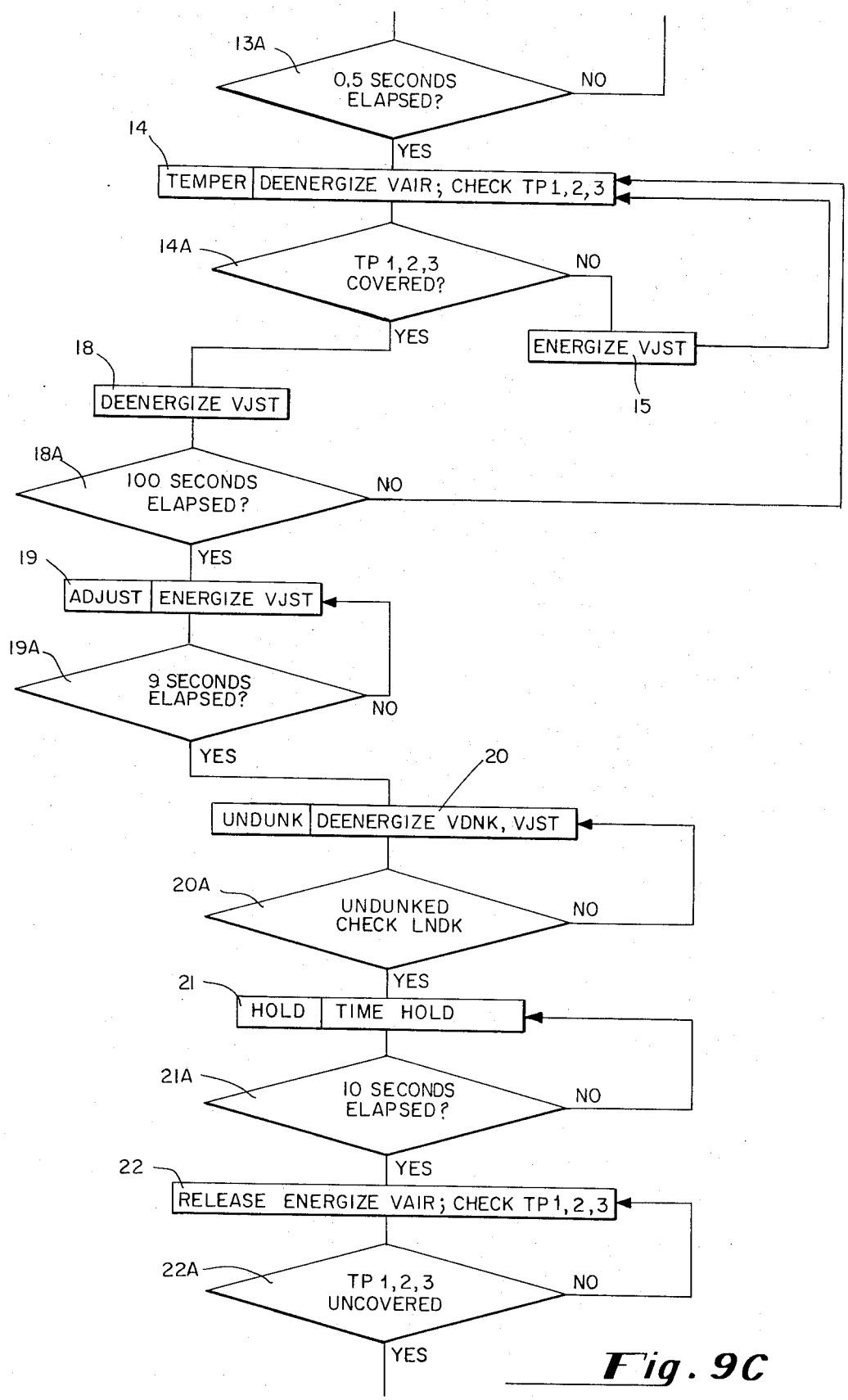
Figure 9D:
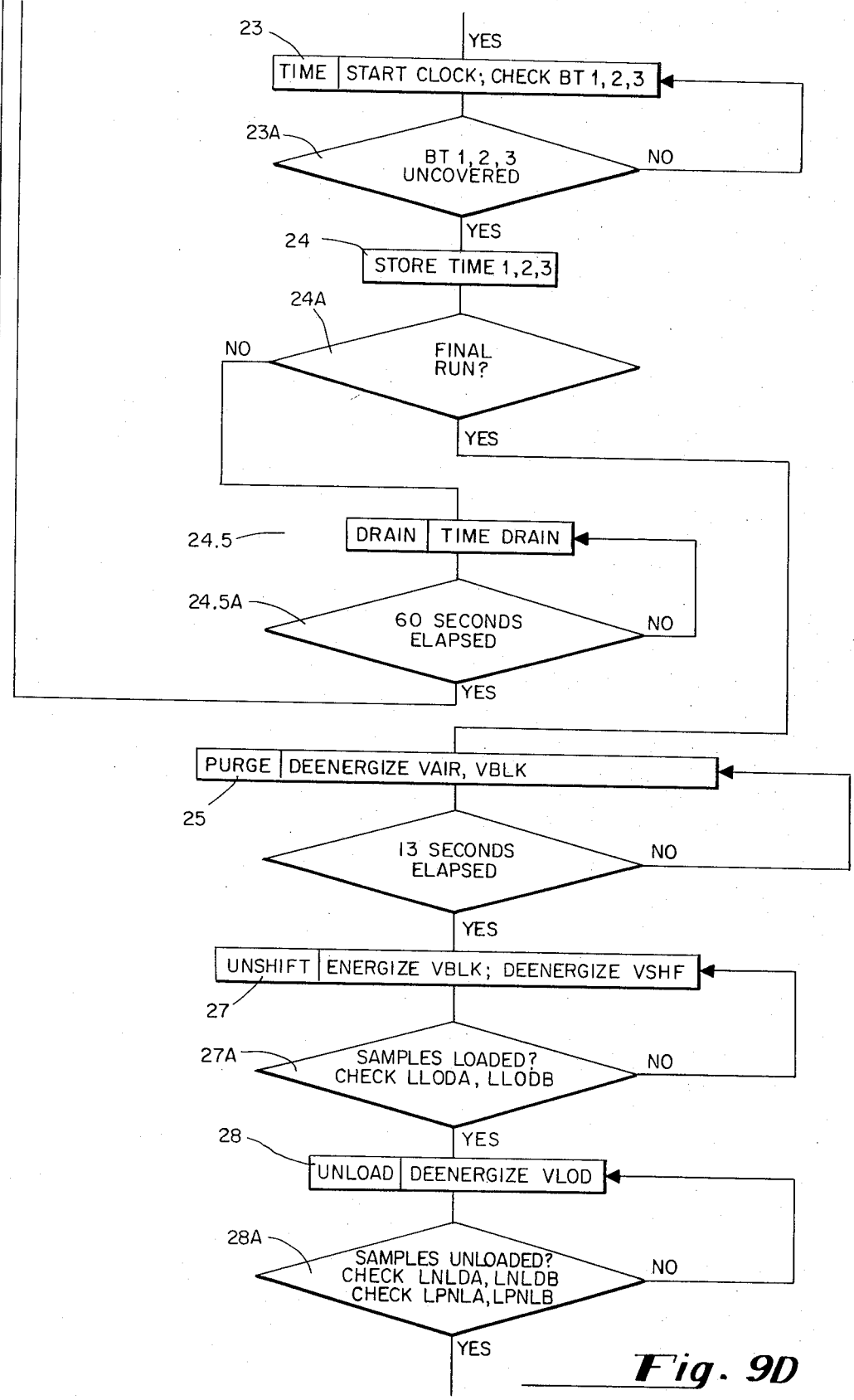
Figure 9E:
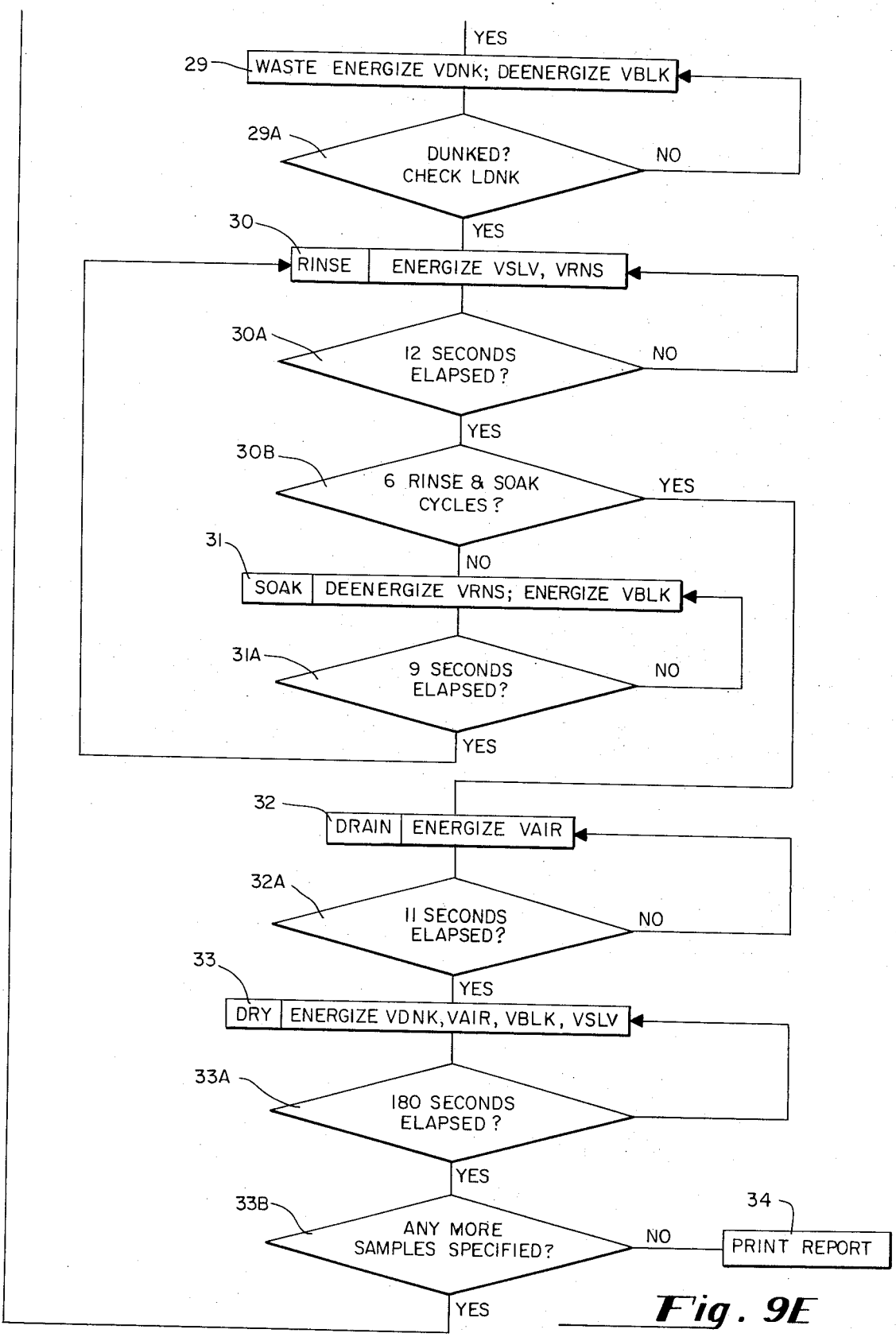

The elements of the liquid bath and temperature control system are shown in FIG. 8. Water is pumped through pipe 185 through the influence of the heating coils 186 where it is brought to the desired temperature and then into the inner area 187 of the double-walled-liquid-bath chamber 117. A thermistor 188 positioned near the entry of the water is used to regulate the temperature of the inflowing water. The water circulates around the viscometer tube and down below the inner wall 189 through channel 190 and returns through outer concentric area 191 returning by line 192 to the pump to be recirculated. A balancing heater coil 193 may be placed around the outer wall 194 of the liquid bath cylinder 117 to provide additional heat. Members 195 and 196 serve to seal the bath area and, of course, are watertight.

Different modifications may be used as for example a mercury thermoregulator. A single wall bath structure may be used, but precision in temperature control will be sacrificed. Space limitations make a temperature bath of approximately only 2 liters desirable.

The primary objective of the temperature bath is to achieve the ability to maintain temperature within $\pm 0.02°$ F. in accordance with the ASTM specification. In using the water bath of FIG. 8 with a thermistor (as a temperature sensor) and circuit similar to that used to sense oil in the viscometer tube, control within $\pm 0.01°$ F. at 100° F. was achieved. Similar control was achieved at 210° F.

The steps of the operation can be readily understood by referring to the flow chart of sequence 9A through 9E depicting a programmed operation for running a sample. For the following sequence of steps viscometer complexes 121 and 123, FIG. 2, hereinafter referred to as viscometer A and B, will be operated concurrently. It will be assumed that each of the viscometer units measures a sample, one unit measuring at 100° F. and the other at 210° F.

In the flow chart of FIG. 9A–9E code names starting with L are used to refer to limit switches that signal the completion of an operation. Names starting with V are valves which supply air to the pistons that move parts or control the flow of the oil samples and cleaning agents. It is assumed that a computer equipped with a teletypewriter and programmed in one of the usual ways to carry out the operations is used.

Step 1 is referred to as the advance step. At this time the turntable brings one set of samples under the two viscometer tube assemblies, A and B. This step is carried out physically by a signal from the controller 174 which energizes VVNC 213 which supplies air to the right side of the piston in pneumatic cylinder 205 which through a ratchet arrangement turns the turntable 111 (See FIGS. 1 and 5). As indicated in block 1A, if samples have been moved into place, limit switches LNLD A and LNLD B, 224, are closed by the jars 113 pushing against them. With reference to block 1B if no samples are in position operations will cease and "NO SAMPLE" will be printed by the teletype.

Once the samples are in correct position the next step is the load step shown as step 2 in which VLOD, 212, is energized causing pneumatic cylinder 240 to raise the sample on a lifter, 135, loading it into the jacket 122. The sample for the B viscometer is also loaded at the same time. VLOD signifies these operations and VAIR signifies the admission of air to the top of the viscometer by energization of solenoid valve VAIR, 167. When the samples are loaded, switches LLOD A and LLOD B are actuated by the jars pushing against them.

The next step is the shift operation shown as step 3 in which the controller gives a signal which causes the pneumatic cylinder 200 to shift the carriage, 125, putting each sample under the appropriate viscometer tube assembly. VBLK refers to valve 169 which blocks solvent or nitrogen from the viscometer tube. VSHF, 211, refers to the piston in cylinder 200 which shifts the sample under the viscometer tip 133. Block 3A makes reference to the limit switch 222 which is actuated by the carriage after the sample has been shifted under the viscometer tip 133. While concurrent measurements are being carried out on the dual system the following will be directed to just one of the operations.

The next step is called the "DUNK" step and is shown as step 4. When this occurs the entire framework 131 is lifted so that the viscometer tube tip 133 is immersed in sample jar 113. VDNK refers to the actuation of the valve 210 which causes the framework to be raised. Once the limit switch LDNK 220 indicates that the viscometer tip has been dunked in the sample as shown in block 4A, step 5 can be conducted. Step 5, the settle step, allows the oil to come up into the tip to the level on its outside. After twelve seconds have elapsed as shown in block 6A, the controller notes as shown in block 6B whether this is a first run on the samples being tested the importance of which will be described.

If it is the first run the filling operation as described in step 7 takes place. When valve VFIL, 168 is energized, the large vacuum from capacitor 178 is applied. As previously described, regulator 202 supplies a vacuum of about ten pounds per square inch below atmospheric pressure or five pounds absolute. This would operate through restrictor 176 to draw about 40 ml. of oil per minute up through the viscometer tube 132, assuming that the oil has zero viscosity. Since the rise of the oil would be somewhat slow the 15 ml. capacitor 178 causes the viscometer tube tip 133 to fill up to its neck immediately. This capacitor 178 is really a chamber which has been evacuated beforehand so that when valve 166 is opened, a sudden surge takes place. Otherwise as much as twelve seconds would be lost in drawing the oil up to where the first capillary 134 begins. The flow times can be adjusted by varying the resistance of the resistor 176. As step 7 shows for the first filling, VAIR which admits air to the top of the viscometer is de-energized and VFIL which admits the large vacuum is energized. The notation "Check TP1" refers to the upper of the lowermost series of meniscus sensors, i.e., the one at position 151.

Assume first that a sample of very viscous oil is being used. If the oil does not reach sensor 151 or TP1 by 9 seconds a time delay circuit in the controller will act to cut off the vacuum when the oil reaches sensor 151. This is indicated by step 8, i.e., that No. 1 or the lowest capillary has been selected. Thus, TP1 is covered (8A) and when it shuts off the vacuum, it will energize valve VAIR momentarily to let a little air in the system to kill the vacuum effect that would otherwise remain in the system for a period of time as shown by step 13.

With reference to block 7A et seq., if TP1 or meniscus sensor 151 is covered by the rising oil within 9 seconds or less, step 9 shows that No. 1 capillary or capillary 134 is rejected and TP2 or meniscus sensor 153 is the next check point. As indicated by block 9A and 9B, if TP2 is not covered within 15 seconds then the second capillary or capillary 136 is the proper choice for the test. In this case No. 2 capillary or capillary 136 will be selected as shown in step 11 and the vacuum will be cut off as the oil reaches TP2 as shown in 11A and step 13, with step 13 being the same step as would have been performed if the first capillary had been selected as described above.

Returning to block 9A, if TP2 is covered within 15 seconds the third capillary or capillary 132 is selected. If this is the case, oil will continue to rise until TP3 or meniscus sensor 155, the uppermost sensor is covered. When this occurs, step 13 will then take place as was the case for the earlier two examples where capillary 134 or capillary 136 were selected.

VAIR is opened and closed very quickly as shown in step 13A, since otherwise if too much air enters the system the oil will coast back down into the sample jar again. Once the air has been shut off as is done by step 14, there is the possibility that the oil sample will have been pushed down a little below the top sensor whether it be sensor position 151, 153 or 155 depending on which capillary has been selected. If this is not the case, and oil covers the sensor, VJST or valve 166 will remain closed (step 18). However, if the sample is somewhat below the top sensor, VJST will open (step 15) and will slowly draw the sample up until it hits the sensor at which time it will be shut off (step 18). This is done by the 0.3 ml capacitor 177 and fine restrictor 175 which has a flow rate of about 0.4 ml per minute.

During this fine adjustment, the flow is very slow and may take as long as a minute. This time period is not critical, however, since it is necessary to hold the oil up in the water bath for at least this long to attain the operating temperature. The oil adjustment step takes place simultaneously while the oil is coming to temperature equilibrium.

Before measurements can be taken it is, of course, imperative that about 0.3 ml of the oil be above the uppermost sensor for the capillary involved. Despite the application of the 0.4 milliliter per min. of vacuum, a further check has been provided for. As shown, there is a 0.3 ml capacitor, 177, behind valve 166. As a final adjustment, VJST is opened, (step 19) to permit another .3 milliliters of oil to be drawn up into the overflow bulb above the capillary being used. This step will always occur as a matter of course, as seen from the flow chart regardless of whether the 0.4 milliliter per min. system had been used.

Once this final adjustment is completed the "UN-DUNK" step, which is step 20 occurs.

It is necessary for the oil to be drained from the viscometer tube tip 133 before measurements can be taken, since a suspended level measurement is used on the order of that taken in the well known Atlantic viscometer (See Appendix B of the ASTM D2515 standard of 1970). For this to occur, the sample jar 113 is lowered causing the oil to drain from the viscometer tip 133. After the viscometer tip has been undunked (LNDK of step 20A) the oil is held for about 10 seconds to permit the suspended level to form (Step 21). Then the controller opens the viscometer to the atmosphere as indicated by the VAIR energization of step 22. This is essentially the same step (step 13) that was used to admit air to the system briefly when the initial vacuum was cut off. However, here the valve is opened for the time that it takes the oil to flow out of the tube 132. At the same time that the atmospheric pressure flow starts, step 22, the controller sets itself so that instead of detecting the filling operation, it is now going to detect the emptying operation. It receives signals from the top sensor of the previously selected capillary through the sensor amplifier 179. When the top sensor is uncovered the controller begins timing (step 23). At this time a clock (not shown) or some means of timing is actuated. In addition, control is transferred to the bottom sensor (as designated by BT 1, 2, 3) of the series of sensors instead of the top one because now the oil must be sensed as it flows past this bottom sensor 150, 152, or 154. It will take the oil sample anywhere from approximately 30 to 150 seconds depending on the viscosity of the oil. Referring to step 24, when the oil gets to the bottom sensor it will send a signal back through the amplifier and back to the controller causing it to move down to the next step and stop the clock. The necessary data for obtaining the viscosity has now been obtained and a print-out can be received or the data stored or included in a report as desired.

At this point either a duplicate run of the sample is made (step 24A) or the sample is removed and the viscometer tube 132 cleaned in preparation for the next sample. Duplicate runs are often desired as a check on the initial determination and they can be easily made. If a duplicate run is to be made the viscometer tube is allowed to drain until the bulk of the sample has drained from the tip (step 24.5). If this is not done large air bubbles will be drawn in on the second fill. Since the range of viscosity has already been determined it is not necessary to go through the elaborate filling operation as was conducted on the initial determination. Thus from step 24.5A the program returns to step 4 where steps 4 to 6B are repeated. At this point if the sample is not a first run steps 7 through 11 are eliminated. The controller is set to fill the capillary suited to the sample as determined in the first run on this sample. If the procedure were otherwise, problems would be encountered, since in the absence of cleaning and drying steps the viscometer tube would be wet and less oil would flow in than would be the case when an air-dried tube is used. This difference could lead to the inflowing oil being timed differently and included in a different viscosity range whereby a less viscous capillary might be used.

Thus, on the second measurement the oil is filled to the point-adjust level of the top sensor, it is moved up gradually to insure coverage of the sensor, the 0.3 milliliter surge is applied, the jar 113 is lowered, and atmospheric pressure is admitted with the downward flow time being recorded and printed out.

At the completion of the desired testing, in this case two runs, the controller will return the jar 113. In step 25 VAIR is de-energized stopping the admission of air. Also VBLK or valve 169 is de-energized admitting nitrogen to the viscometer and purging the sample from it rapidly. In step 27 referred to as the unshift step VBLK is energized and VSHF, 211, is de-energized which shifts the sample away from the viscometer tip 133. Simultaneously, as the jar 113 is being returned, the waste receptacle 127 is allowed to slide back under the viscometer tube tip 133. Limit switches, 223, shown in step 27A will sense when the jar 113 is loaded again on the piston lifter 135. In step 28, the unload step VLOD is de-energized and cylinder 240 unloads the sample from the jacket 122 onto the turntable. The unloading of the jar is checked in step 28A by limit switches LNLD A and LNLD B. The lowering of lifter 135 below the turntable is checked by LPNLA and LPNLB, 225.

Step 29 is called the "WASTE" step in which VDNK is energized to surround the tip of the viscometer by the waste receptacle 127 in like manner as is done with the sample jar. This action is checked by limit switch LDNK 220 in step 29A. In step 30 the rinse step, both cleaning valves VSLV 170 and VRNS 171 are open to emit solvent into the tube through 169, 168, 167, and 166; and around the outside of the tube through jets 203. When solvent is first permitted to run through the tube, some of it will run on through carrying out oil while some remains in the capillaries. After a period of twelve seconds as shown in step 30A, the soak step 31 begins in which additional solvent or nitrogen is blocked and a nine second period of time as shown in step 31A takes place allowing the remaining solvent to soak and dissolve oil residues.

At the completion of six cycles of rinse and soak (step 30B) VAIR admits air to the viscometer tube allowing the solvent to drain (step 32) for 11 seconds (step 32A). Then the dry step, designated as step 33, occurs. At this point nitrogen is applied again for 180 seconds (step 33A) until all the solvent is evaporated throughout the viscometer tube 132. By this time the previously tested sample has been returned to its place on the turntable 111 (step 28) and the system is ready for the advancement step and the next set of samples as shown in step 33B. If more samples are not forthcoming the report shown by step 34 will be printed.

Figure 2:
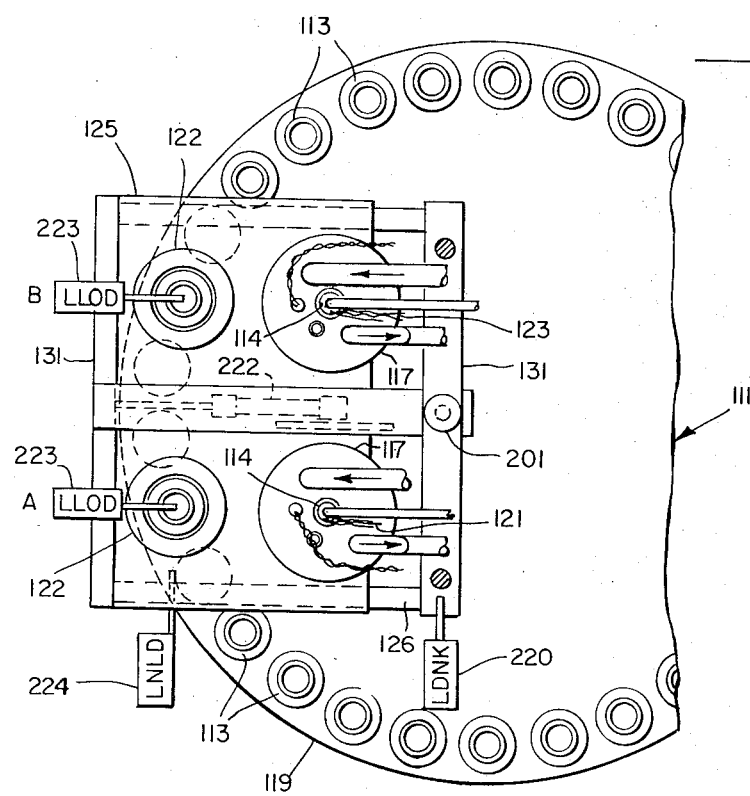
FIG. 2 is a top elevational view of the viscometer of FIG. 1.

The overall unit may be designed to contain two separate viscometer assemblies 121 and 123 as FIG. 2 illustrates which can be operated at the same or different temperatures as described above. If both assemblies 121 and 123 are operated at the same temperature, the system can be adjusted so that the first tube 121 will run the odd numbered samples and the second 123 the even numbered samples giving a single determination per sample; or duplicate runs on each sample may be made making possible an average determination based on two timing operations. In standard oil refinery operations viscosity determinations are normally made at temperatures of 100° F. and 210° F.

The pneumatic cylinders and the valves that perform the above operations are controlled by an electrical logic network contained within the controller shown as 174. With double or triple units, control by a small line computer such as Digital Equipment Corporations' PDP 8/M is possible. The computer will calculate the viscosity of each sample as soon as it is run and print out the result immediately on its teletype. The computer may also be programmed to punch out the data on paper tape. The tape can be fed into a central computer which will combine it with other data on the sample and prepare a complete report, thus eliminating all paper work by the operator.

It will be appreciated that the viscometer tube 132 may itself be used in the automatic apparatus as outlined above or that it may be used for semi-automatic or manual testing. Less sophisticated sensors may be used in place of the thermistor. Spark detectors or photocells may be used or more marks may be made on the tube 132 to permit visual determinations with the filling step determined by visual observance.

While various embodiments of the invention have been shown and described, it will be understood that various modifications may be made. The appended claims are, therefore, intended to define the true scope of the invention.

I claim:

1. A viscometer capable of measuring liquids of a wide range of viscosities comprising:
    a viscometer tube including a series of interconnected vertically disposed capillaries of varying sizes with the lowermost capillary being the coarsest and each successively higher capillary being finer than the lower preceding one, and further including an open-ended tip below the lowermost capillary for immersion into a liquid sample;
    means for causing a sample of liquid to ascend and then descend within said viscometer tube; and timing means for obtaining the descending time of travel between two points along said tube.

2. The viscometer of claim 1 wherein said timing means includes means for detecting the ascending flow as well as the descending flow of said sample through said capillaries.

3. The viscometer of claim 2 wherein said timing means includes means to determine the ascending rate of flow and by predetermined rates determine which capillary is of size suitable to allow laminar descending flow, the minimum kinetic energy effect, and accurate timing for the range of liquids within which said sample falls.

4. The viscometer of claim 3 wherein said timing means includes means to detect and time the descending flow of said sample within a section of the viscometer tube which corresponds to the descending flow of said sample through the capillary determined to be of suitable size.

5. The viscometer of claim 4 wherein said means for causing said sample to ascend and descend within said tube functions with said detecting means to prevent said sample from rising into a capillary that is too fine to permit a determination in a reasonable time for the range of liquids within which said sample falls.

6. The viscometer of claim 5 wherein said means for detecting ascending and descending sample flow comprises a pair of meniscus sensors for each capillary.

7. The viscometer of claim 6 including means responsive to said meniscus sensors in which the upper of each said pair of sensors detects the ascending flow and is connected to said means for causing said sample to ascend and descend for preventing said sample from rising above the proper measuring capillary and both of said sensors for each capillary cooperate with said timing means to time the descending flow in determination of viscosity.

8. The viscometer of claim 7 wherein each of said capillaries has an efflux bulb directly above said capillary and the upper meniscus sensor for each capillary is placed above the efflux tube and the lower sensor for each capillary is placed below it, said sample being allowed to ascend to cover the upper meniscus sensor for the capillary determined to be of suitable size in which to perform the measurement.

9. The viscometer of claim 7 wherein said means for causing the sample to ascend and descend comprises a pressure manifold for admission of both positive and negative pressure so that said sample may first be drawn into said capillaries by negative pressure and then released from said capillaries after application of positive pressure.

10. The viscometer of claim 9 wherein an overflow bulb is placed above each said efflux bulb to safeguard against the sample rising into the next succeeding capillary and in the case of the upermost efflux tube to safeguard against the sample rising into said pressure manifold.

11. The viscometer of claim 10 including means to adjust the height of said sample meniscus so that the uppermost meniscus sensor of a series is covered prior to initiating sample descent yet assuring that said sample is not drawn up past the overflow bulb and into the next succeeding capillary.

12. A viscometer tube comprising a series of interconnected vertically disposed capillary tubes of varying sizes with said lowermost capillary tube being the coarsest and each successively higher capillary tube being finer than the lower preceding one.

13. The viscometer tube of claim 12 wherein an efflux bulb is positioned between each of said interconnected capillary tubes and above said uppermost capillary tube.

14. The viscometer tube of claim 13 wherein means for measuring sample menisci are positioned respectively above and below each of said efflux bulbs.

15. The viscometer tube of claim 14 wherein an overflow bulb is placed above each of said efflux bulbs.

16. The viscometer tube of claim 15 wherein a liquid heating bath surrounds said viscometer tube, said liquid heating bath having an innerchamber and an outerchamber designed to enable heating liquid to flow into the innerchamber next to said capillary tube and return through said outerchamber to be recirculated after reheating.

17. The viscometer tube of claim 14 in which said means for measuring comprises thermistors forming meniscus sensors which penetrate into two spaced regions of each of said capillary tubes.

18. A method of measuring viscosity comprising the steps of:
drawing a sample liquid into a viscometer having in series multiple capillaries of different sizes flow-connected one above the other with decreasing size of each capillary disposed above the one below it;

timing the incoming flow of the liquid through each said capillary in selection of which capillary should be used for conducting the measurement;
stopping the incoming flow of liquid after said selection of said capillary for said measurement;
releasing the liquid to allow it to flow out of the capillary; and
timing the outgoing flow to obtain a time interval which is a function of the viscosity.

19. The method of claim 18 in which the step of timing the incoming flow further comprises:
detecting the liquid meniscus after flow through a particular capillary to provide the upward flow time through that capillary;
comparing the upward flow time with known flow times to determine whether that particular capillary is suitable in size to be used to measure the sample liquid; and
repeating the detecting and comparing steps for additional capillaries until a capillary suitable in size is reached.

20. The method of claim 18 in which the step of timing the outgoing flow further comprises:
detecting the outgoing meniscus by means of a first detector which was also used to time the incoming flow; and
by means of a second detector determining the viscosity from the time which the sample took to flow between the first and second detectors.

21. The method of claim 18 wherein the step of stopping the incoming flow of liquid further comprises a programmed vacuum sequence comprising the steps of:

bringing the incoming flow of liquid to the approximate level of a leveling sensor by means of a large vacuum pulse providing a fast vacuum flow; and covering the leveling sensor with liquid by means of a small vacuum pulse providing a slow vacuum flow.

22. A method of measuring viscosity comprising the steps of:
  drawing a sample liquid into a viscometer having multiple capillaries of different sizes;
  detecting the liquid meniscus after flow through a particular capillary to provide the inward flow time through that capillary;
  comparing the inward flow time with known flow times to select that particular capillary suitable in size to be used to measure the viscosity of the sample liquid;
  repeating the detecting and comparing steps for additional capillaries until a capillary suitable in size is reached;
  stopping the incoming flow of liquid after said selection of said capillary for said measurement;
  releasing the liquid to allow it to flow out of the selected capillary; and
  timing the outgoing flow to obtain a time interval which is a function of the viscosity.

23. A method of measuring viscosity comprising the steps of:
  drawing a sample liquid into a viscometer having multiple capillaries of different sizes;
  timing the incoming flow of the liquid through each said capillary by means of a first detector in selection of which capillary should be used for conducting the measurement;
  stopping the incoming flow of liquid after said selection of said capillary for said measurement;
  releasing the liquid to allow it to flow out of the capillary;
  detecting the outgoing meniscus by means of said first detector which was used to time the incoming flow; and
  by means of a second detector determining the viscosity from the time which the sample takes to flow from the first detector to said second detector.

24. A method of measuring viscosity comprising the steps of:
  drawing a sample liquid into a viscometer having multiple capillaries of different sizes;
  timing the incoming flow of the liquid through each said capillary in selection of which capillary should be used for conducting the measurement;
  stopping the incoming flow of liquid by a programmed vacuum sequence comprising the steps of:
    bringing the incoming flow of liquid to the approximate level of a leveling sensor by means of a large vacuum pulse providing a fast vacuum flow; and
    covering the leveling sensor with liquid by means of a small vacuum pulse providing a slow vacuum flow;
  releasing the liquid to allow it to flow out of the capillary; and
  timing the outgoing flow to obtain a time interval which is the function of the viscosity.

* * * * *